Figure 1:
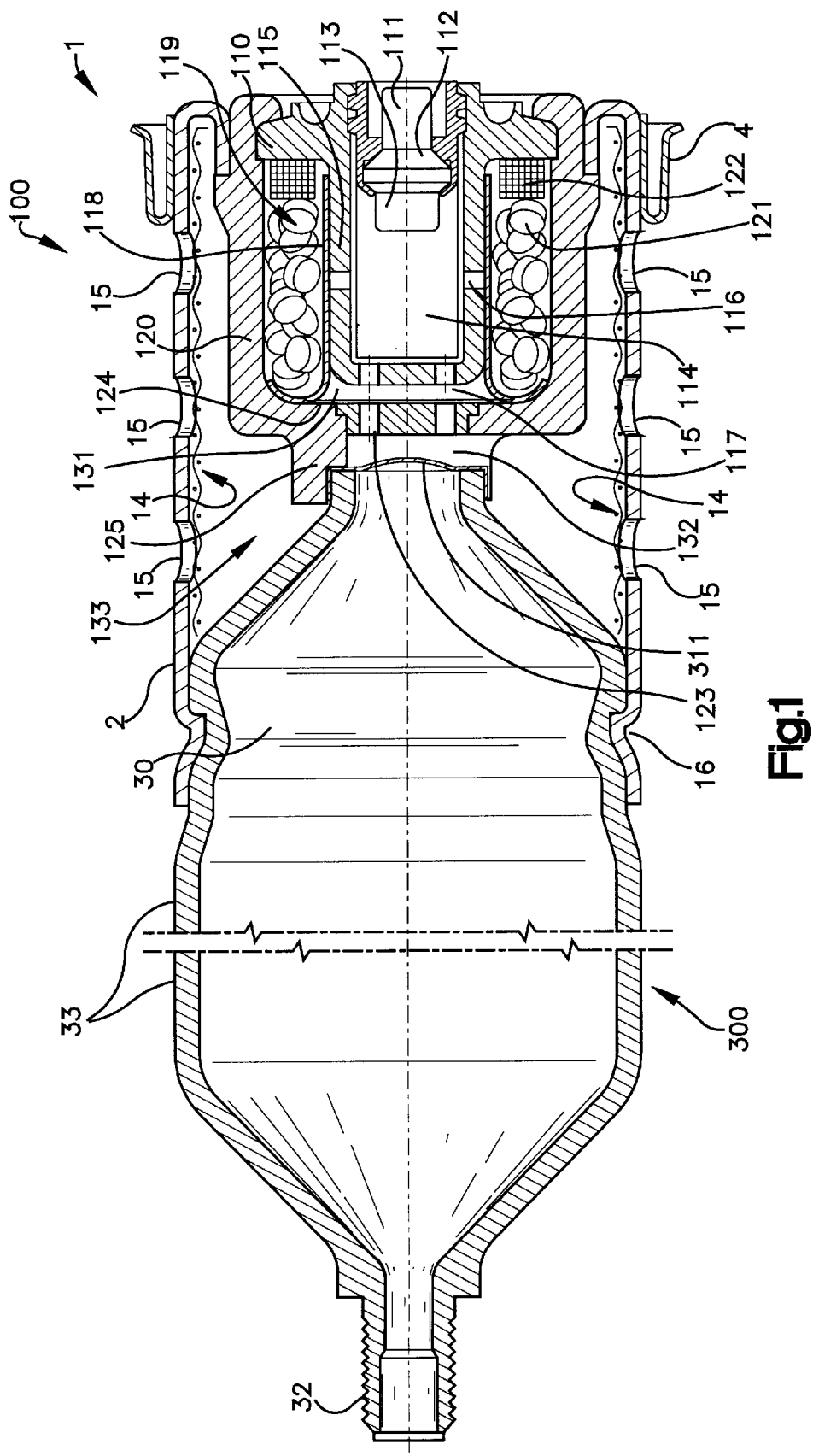

United States Patent
Bauer et al.

[11] Patent Number: 6,042,146
[45] Date of Patent: Mar. 28, 2000

[54] DEVICE FOR FILLING A RESTRAINT DEVICE

[75] Inventors: Hermann Bauer, Heidenheim; Richard Bender, Lauf; Uwe Dölling, Heldenstein; Thomas Kistler; Siegfried Zeuner, both of München, all of Germany

[73] Assignee: TRW Airbag Systems GmbH & Co. KG, Aschau am Inn, Germany

[21] Appl. No.: 09/029,541

[22] PCT Filed: Aug. 3, 1996

[86] PCT No.: PCT/EP96/03431

§ 371 Date: Feb. 27, 1998

§ 102(e) Date: Feb. 27, 1998

[87] PCT Pub. No.: WO97/08019

PCT Pub. Date: Mar. 6, 1997

[30] Foreign Application Priority Data

Aug. 31, 1995 [DE] Germany ............ 195 32 023

[51] Int. Cl.[7] .................................................. B60R 21/26
[52] U.S. Cl. ............................................................ 280/737
[58] Field of Search .................................. 280/736, 741, 280/737; 102/530, 531

[56] References Cited

U.S. PATENT DOCUMENTS

| | | |
|---|---|---|
| 3,731,843 | 5/1973 | Anderson, Jr. ............................. 222/3 |
| 3,806,153 | 4/1974 | Johnson . |
| 3,895,821 | 7/1975 | Schotthoefer et al. . |
| 3,966,226 | 6/1976 | Roth ........................................ 280/737 |
| 5,022,674 | 6/1991 | Frantom et al. . |
| 5,066,038 | 11/1991 | Frantom et al. . |
| 5,263,740 | 11/1993 | Frey et al. . |
| 5,308,588 | 5/1994 | Emery et al. . |
| 5,345,876 | 9/1994 | Rose et al. . |
| 5,364,127 | 11/1994 | Cuevas . |
| 5,513,572 | 5/1996 | Frantom et al. ........................ 102/531 |
| 5,538,278 | 7/1996 | Blackshire et al. .................... 280/736 |
| 5,573,271 | 11/1996 | Headley ................................. 280/741 |
| 5,586,783 | 12/1996 | Adam et al. . |
| 5,813,694 | 9/1998 | Jeong ..................................... 280/737 |

FOREIGN PATENT DOCUMENTS

| | | |
|---|---|---|
| 2171107 | 9/1973 | France . |
| 2231543 | 12/1974 | France . |
| 3832120 | 3/1990 | Germany . |
| 4009551 | 9/1991 | Germany . |
| 4141902 | 7/1992 | Germany . |
| 4242793 | 7/1993 | Germany . |
| 4405997 | 3/1995 | Germany . |
| 7040801 | 2/1995 | Japan . |

*Primary Examiner*—Paul N. Dickson
*Attorney, Agent, or Firm*—Tarolli, Sundheim, Covell, Tummino & Szabo L.L.P.

[57] ABSTRACT

The invention relates to a device for filling a restraint device, in particular an impact cushion (airbag) for the protection of the occupants of a motor vehicle, with the following features. The restraint device is filled by an inert gas or gas mixture stored in a pressure container; the pressure container has an outlet opening which is closed by a burstable membrane; a module for opening the membrane is associated with the outlet opening; the module has an ignition unit; the igniter case is surrounded by a toroidal propellant chamber; for the ignition of the propellant stored in the propellant chamber, the igniter case has, in addition to axial nozzles, further nozzles directed radially outwards and finally a flow control is provided which directs the hot gas, produced by the propellant, onto the membrane.

13 Claims, 1 Drawing Sheet

DEVICE FOR FILLING A RESTRAINT DEVICE

The invention relates to a device for filling a restraint device, in particular an impact cushion (airbag) for the protection of the occupants of a motor vehicle, the restraint device being filled by means of an inert gas or gas mixture stored in a pressure container in accordance with the introductory clause of claim 1.

A generic hybrid gas generator is known for example from the patent document DE 44 05 997 C1.

For the hybrid gas generator described therein, having a pyrotechnic gas generator and a high pressure container, in which after the ignition of propellant, hot propellant gases flow out from an opening of a combustion chamber and blow against a sealing disc of the high pressure container arranged opposite the opening and after the sealing disc is opened, the propellant gases and gas from the high presure container flow through outlet openings into a gas bag, the use of a formulation for the propellant is proposed with a surplus of substances for generating a chemically reactive propellant gas, which attacks the sealing disc on its surface not only thermally, but also chemically and continuously burns through it, in order to open the closing sealing disc without the occurrence of a high acoustic pressure.

The hybrid gas generator described therein has the disadvantages that on the one hand only an unsufficient mixing takes place between the cold gas stored in the high pressure container and the pyrotechnically produced hot gas in the mixing chamber, so that owing to the only slightly cooled hot gas a severe thermal stressing takes place of parts of the gas generator and of the impact cushion. This results firstly in an increased risk of injury to vehicle occupants and secondly, greater wall thicknesses of the relevant parts are necessary, and hence additional material and weight. On the other hand, the gas generator has a non-reproducible opening behaviour of the membrane, so that the moment at which cold gas emerges from the high pressure container is afflicted with a high element of uncertainty. The propellant is in a quantity such that only the membrane is welded open and only an insufficient heating of the compressed gas takes place at a low ambient temperature.

It is therefore an object of the invention to indicate a hybrid gas generator of the type initially mentioned, by which the above-mentioned disadvantages are avoided.

This problem is solved by a device for filling a restraint device, in particular an impact cushion (airbag) for the protection of the occupants of a motor vehicle, with the following features:
the restraint device is filled by means of an inert gas or gas mixture stored in a pressure container;
the pressure container has an outlet opening which is closed by a burstable membrane;
a module for opening the membrane is associated with the outlet opening;
the module has an ignition unit;
the igniter case is surrounded by a toroidal propellant chamber;
for the ignition of the propellant stored in the propellant chamber, the igniter case has further nozzles directed radially outwards, and finally
flow means are provided, which direct the hot gas, produced by the propellant, onto the membrane.

Further developments and advantageous embodiments of the invention are described in the sub-claims.

The advantages of the invention lie in particular in that due to the novel arrangement of the nozzles in the igniter case and of the nozzle bores, the membrane, by which the high pressure container is closed, is opened at an earlier moment. The cold gas is thereby mixed earlier and consequently better with the pyrotechnically produced hot gas of the ignition unit, and the thermal stress on parts of the gas generator and of the impact cushion is reduced.

An example embodiment of the invention is explained in detail hereinbelow and illustrated with the aid of a FIGURE.

The FIGURE shows a hybrid gas generator 1, consisting of a pyrotechnic module 100 and of a compressed gas container 300 with filling device 32 and compressed gas container wall 33. The filter housing 2 and the compressed gas container 300 are held together by means of a connection 16 in the nature of an interlocking fit.

The pyrotechnic module 100 is arranged as a slide-in unit in a filter housing 2 with exhaust openings 15 and a flange 4 for fastening an impact cushion and consists substantially of an ignition unit 110 and a combustion chamber unit 120. The compressed gas container 300 has an outlet nozzle 310 which is closed by means of the membrane 311. The opening behaviour on welding through can be influenced by a suitable convexity or indentation of the membrane 311 and by the distance between the membrane 311 and the pyrotechnic module 100, which is produced by a spacer 125.

The ignition unit 110 contains an electric igniter 112 with an electric connection 111 which is preferably constructed as a plug unit. In order to trigger the hybrid gas generator 1, a high ignition current is supplied to the electric igniter 112. Thereby, a fuse wire arranged inside the electric igniter 112 melts and ignites a primary charge 113. This has the result that a secondary charge 114, serving as booster, ignites and its deflagration products flow out through one or more radial nozzles 116 and one or more axial nozzles 117 of an igniter case 115. The nozzles 116 and 117 are arranged here concentrically on pitch circles and can be formed differently or have a different diameter.

In the combustion chamber unit 120, a solid propellant 121 is arranged in the form of granulated material, rings, tablets or the like, and which is surrounded by an insulation 118 towards the igniter case 115. Volume equalizers 122 provide for a secure hold of the solid propellant 121 and prevent a noise generation during travel.

As a result of the deflagration of the secondary charge 114, the membrane 311 is welded open and at the same time the solid propellant 121 is ignited, whereby further hot gas is released.

In a prefixing zone 131 between igniter case 115 and the base of the combustion chamber unit 120, hot particles of the secondary charge 114 and propellant gas from the solid propellant 121 are mixed and, after flowing through one or more nozzle bores 123, act on the membrane 311 so that it is welded through and the gas stored in the compressed gas container 300 can emerge.

In a mixing zone 132, which is formed by means of the spacer 125 between the membrane 311 and the combustion chamber unit 120, a mixing takes place between the cold gas flowing out from the compressed gas container 300 and the hot gas produced from the solid propellant 121, which mixing continues in a mixing chamber 133 surrounding the combustion chamber unit 120. Due to this early starting and complete mixing, a well tempered gas mixture is produced, so that a high thermal stressing of the gas generator and of the impact cushion on account of insufficiently mixed hot gas is avoided.

The nozzle bores 123 directed onto the membrane 311 are closed on their face facing the ignition unit 110 by a sealing foil 124, in order to prevent the generally moisture-sensitive solid propellant 121 from taking up moisture, which leads to a reduction in the deflagration speed of the solid propellant 121. In addition, by means of the sealing foil 124 which is generally an aluminium foil, the pressure can be determined which occurs on activation by the deflagration of the solid propellant 121. The longer the sealing foil 124 resists the pressure which is building up, the greater the pressure increases in the combustion chamber unit 120.

Each nozzle bore 123 is arranged in a line with the respective nozzle 117, so that the emerging hot gas strikes the membrane 311 in an unimpeded manner.

The diameter of the nozzle bores 123 must be dimensioned in accordance with how much hot gas must flow through them, in order to achieve a burning through of the membrane 311 in shortest time, so that the cold gas stored in the compressed gas container 300 can emerge.

As already described above, the cold gas emerging from the compressed gas container 300 mixes in the mixing chamber 133, arranged around the combustion chamber unit 120, with the hot gas produced in the combustion chamber unit 120 into a gas mixture with defined temperature, which is low enough not to damage the impact cushion or parts of the hybrid gas generator 1. As the by far greatest proportion consists of the very pure cold gas, a cool and clean gas mixture is produced in the mixing chamber 133; a costly multiple-stage filter system for cooling and cleaning the gas stream is therefore not necessary. At least one filter layer 14 is simply arranged in front of the exhaust openings 15.

Due to the modular structure, a simple and favourably-priced construction of the hybrid gas generator results. The individual modules and the compressed gas container can be pre-assembled separately and checked, before all structural groups are connected with each other in the final assembly.

What is claimed is:

1. A device for filling a restraint device in particular an impact cushion for the protection of an occupant of a motor vehicle, the device comprising a pressure container (300) containing an inert gas or an inert gas mixture for filling the restraint device, the pressure container having an outlet opening closed by a burstable membrane (311); a module (100) for opening the membrane (311), the module being associated with the outlet opening (310) and including an actuatable pyrotechnic ignition unit (110); and an igniter case (115) having first nozzles (117) arranged opposite the membrane (311) to direct combustion products upon ignition of the ignition unit against the membrane to open the membrane, the igniter case being part of the ignition unit (110); a toroidal propellant chamber (119) surrounding the igniter case, propellant (121) in the toroidal propellant chamber; the igniter case having second nozzles (116) directed radially outwards and in communication with the propellant chamber (119) to direct combustion products upon ignition of the igniter unit to the propellant (121) to ignite the propellant; and flow means (123) in said ignition unit (110) for directing hot gas produced by the propellant unit (121) onto the membrane (311) to assist in opening the membrane.

2. The device according to claim 1, wherein the propellant chamber (119) and the ignition unit (110) are received in a combustion chamber unit (120) and the flow means (123) comprises nozzle bores.

3. The device according to claim 2, wherein the nozzle bores (123) are arranged so as to be axially aligned with the first nozzles (117).

4. The device accordingly to claim 3, wherein the combustion chamber unit (120) is constructed such that the first nozzles (117) in the igniter case (115) are spaced apart from the nozzle bores (123) in the combustion chamber unit (120).

5. The device according to claim 1, wherein a sealing foil (124) is arranged upstream of the nozzle bores (123) towards the ignition unit (110).

6. The device according to claim 5, wherein the sealing foil (124) is an aluminum sealing foil.

7. The device accordingly to claim 1, wherein the propellant (121) is surrounded by an insulation (118).

8. The device according to claim 1, wherein the pressure container (300) is reduced in diameter in the region of the outlet opening (310).

9. The device according to claim 8, wherein the combustion chamber unit (120) surrounds the outlet opening (310) in a peripheral region thereof.

10. The device according to claim 1, wherein the module (100) has a combustion chamber unit (120) and a mixing chamber (133), which are located in a filter housing (2) having exhaust openings (15).

11. The device according to claim 10, wherein the filter housing (2) surrounds the combustion chamber unit (120), thereby forming the mixing chamber (133).

12. The device according to claim 10, wherein at least one filter layer (14) is located in the mixing chamber (133).

13. The device according to claim 1, wherein the module (100) and the compressed gas container (300) are held together by interlocking portions of the module (100) and compressed gas container (300).

* * * * *